United States Patent
Mantle et al.

(10) Patent No.: US 9,752,062 B2
(45) Date of Patent: Sep. 5, 2017

(54) SWITCHABLE ADHESIVE AND OBJECTS UTILIZING THE SAME

(71) Applicant: Interface International B.V., Industrielaan (NL)

(72) Inventors: John Robert Mantle, West Yorkshire (GB); James Hanley Clark, York (GB); Peter Samuel Shuttleworth, West Yorkshire (GB)

(73) Assignee: Interface International B.V., Industrielaan (NL)

( * ) Notice: Subject to any disclaimer, the term of this patent is extended or adjusted under 35 U.S.C. 154(b) by 64 days.

(21) Appl. No.: 14/722,381

(22) Filed: May 27, 2015

(65) Prior Publication Data

US 2015/0252225 A1    Sep. 10, 2015

Related U.S. Application Data

(63) Continuation of application No. 12/563,552, filed on Sep. 21, 2009, now abandoned.

(30) Foreign Application Priority Data

Aug. 17, 2009 (GB) .................................. 0914377.7

(51) Int. Cl.
| | |
|---|---|
| *C09J 103/06* | (2006.01) |
| *C08B 31/04* | (2006.01) |
| *D06N 7/00* | (2006.01) |
| *B32B 37/12* | (2006.01) |
| *B32B 37/18* | (2006.01) |
| *B32B 38/00* | (2006.01) |

(Continued)

(52) U.S. Cl.
CPC ......... *C09J 103/06* (2013.01); *B32B 37/1284* (2013.01); *B32B 37/18* (2013.01); *B32B 38/00* (2013.01); *B32B 38/10* (2013.01); *C08B 31/04* (2013.01); *C09J 5/00* (2013.01); *C09J 11/06* (2013.01); *D06N 7/0071* (2013.01); *B32B 2037/1246* (2013.01); *B32B 2471/02* (2013.01); *C09J 2403/00* (2013.01); *D06N 2209/067* (2013.01); *D06N 2213/068* (2013.01); *Y10T 428/23979* (2015.04)

(58) Field of Classification Search
CPC ....................................................... C01J 103/06
See application file for complete search history.

(56) References Cited

U.S. PATENT DOCUMENTS

| | | |
|---|---|---|
| 3,487,033 A | 12/1969 | McElmury et al. |
| 3,546,059 A | 12/1970 | Isguy et al. |

(Continued)

FOREIGN PATENT DOCUMENTS

| | | |
|---|---|---|
| GB | 2362098 | 11/2001 |
| JP | 6343542 | 12/1994 |
| JP | 11280244 | 10/1999 |

OTHER PUBLICATIONS

JP 11-280244 A, English Translation, published Oct. 12, 1999.

*Primary Examiner* — Melvin C Mayes
*Assistant Examiner* — Stefanie Cohen
(74) *Attorney, Agent, or Firm* — McKee, Voorhees & Sease, PLC (57) ABSTRACT

A carpet material with at least one of its components made easier for recycle by use of an adhesive which can be selectively altered to change the adhesion strength to allow component carpet layers to be separated.

28 Claims, 1 Drawing Sheet

(51) Int. Cl.
*B32B 38/10* (2006.01)
*C09J 5/00* (2006.01)
*C09J 11/06* (2006.01)

(56) References Cited

U.S. PATENT DOCUMENTS

| | | | |
|---|---|---|---|
| 4,104,213 | A | 8/1978 | Chiang et al. |
| 4,191,799 | A | 3/1980 | Gruber |
| 4,396,529 | A | 8/1983 | Price et al. |
| 5,230,473 | A | 7/1993 | Hagguist et al. |
| 5,236,977 | A | 8/1993 | Eden et al. |
| 5,240,530 | A | 8/1993 | Fink |
| 5,360,845 | A * | 11/1994 | Billmers ............... C09J 103/06 106/162.81 |
| 5,554,660 | A | 9/1996 | Altieri et al. |
| 5,797,984 | A | 8/1998 | Billmers et al. |
| 5,840,773 | A | 11/1998 | Booij et al. |
| 5,849,387 | A | 12/1998 | Drake, Jr. et al. |
| 5,889,142 | A | 3/1999 | Mohajer et al. |
| 6,610,769 | B1 | 8/2003 | Blanpain et al. |
| 2003/0019560 | A1 | 1/2003 | Mabbutt |
| 2005/0142327 | A1 | 6/2005 | Tajiri et al. |

* cited by examiner

SWITCHABLE ADHESIVE AND OBJECTS UTILIZING THE SAME

CROSS-REFERENCE TO RELATED APPLICATIONS

This is a Continuation Application of U.S. Ser. No. 12/563,552 filed Sep. 21, 2009, now abandoned, which application claims priority to United Kingdom No. 0914377.7 filed Aug. 17, 2009, herein incorporated by reference in their entirety.

BACKGROUND OF THE INVENTION

The current invention relates to a means whereby an object can be rendered more readily adaptable from a first form suitable for a first use to a second form suitable for a second use, and to an adhesive, in particular, but not necessarily exclusively, a hot aqueous solvent switchable adhesive comprising or essentially consisting of a plasticized esterified expanded starch obtained by at least expanding starch to provide an expanded starch, esterification of the expanded starch to provide an esterified expanded starch, and plasticization of the esterified expanded starch to provide a plasticized esterified expanded starch. In particular, the current invention relates to a method of using such hot aqueous solvent switchable adhesive as the agent for allowing the adaptability of the object to be achieved, and the use and preparing of such adhesive for use in various objects to render the same more readily recyclable as a result of the adaptability. In particular, the invention is directed towards floor coverings such as carpet, carpet tiles or rugs with a first form for use as the floor covering or part thereof and a second form in which at least one of the components of the object is more readily available to be recycled.

Floor coverings are widely used and examples of these are carpet tiles, carpets or rugs (hereinafter referred to in a non limiting manner as "carpets or carpet tiles"). Carpets or carpet tiles are the floor covering of choice in many households and businesses in the world but unfortunately carpet or carpet tiles have a limited lifespan and must eventually be replaced, with the resultant used carpet waste generally being sent to landfill.

These vast quantities of carpet waste have a negative impact on the environment, and the recycling of materials, like nylon and bitumen, comprised in the carpet is currently limited. The quantity of used carpet or carpet tiles discarded thus amounts to significant economical losses in potentially reusable materials.

It is therefore not surprising that, in order to limit impact on the environment and reuse some of the materials in carpet or carpet tiles, recycling has in recent years become attractive. Recycling carpet or carpet tiles, however, is difficult because the components that are used to build up carpet or carpet tiles are chemically and physically diverse.

Carpets or carpet tiles, typically comprise a traffic-bearing or wear face surface on a primary backing such as a fibrous face surface (hereinafter referred to as a carpet face layer), which has been woven, needle-punctured, fusion-bonded or otherwise secured to a primary backing layer or sheet, and a backing layer which includes a surface to which is bonded one or more layers of solid or foam backing material.

A solid backing material typically comprises thermoplastic-type materials like a polyvinyl chloride backing material or a bitumen or atactic polypropylene backing layer. For example, carpet or carpet tiles can consist of a carpet face layer of yarn (or carpet fibre), and a backing layer which includes any or any combination of bitumen, EVA (ethylene-vinyl acetate), APP (atactic polypropylene), hot melts, urethanes, and SBR (styrene-butadiene)) and/or polypropylene; and an adhesive composition which attaches the filaments of the carpet face layer (yarn; carpet face fibres) to the backing layer. In addition, other components like a glass backing, or a primary backing fabric may be present (see FIG. 1).

A widely applied adhesive to bind the filaments within the carpet face layer together and bind the carpet face layer to for example the bitumen backing layer of the carpet or carpet tiles is latex, in particular carboxylated styrene butadiene copolymer latex, also referred to as SBR-latex. Such materials have been used as carpet or carpet tiles backing adhesives for many years.

To recycle carpet or carpet tiles, the carpet face layer, adhesive and backing layer should typically be separated from each other in order to be reprocessed into new products or to be chemically recycled. Unfortunately, recycling of the components of carpets or carpet tiles are hindered due to the residual presence of adhesive, for example SBR latex, when the layers have been mechanically separated under great tensile stresses. In other words, adhesive might still be present both in the yarn of the carpet face layer and in/on the backing layer, thereby providing contaminated materials not suitable for proper reuse.

Various methods for better separation of the components of carpet or carpet tiles have been proposed, either by mechanical means or by adjusting the build-up of the components of the carpet or carpet tiles. For example, U.S. Pat. No. 5,240,530 discloses a method of grinding carpet and washing in a water bath to allow the various materials of the carpet to be separated by density. This method will however not solve the problem of residual presence of the adhesive attached to for example the yarn or the backing.

U.S. Pat. No. 5,230,473 describes a method for disintegrating, separating and segregating the base component materials of carpet, which comprises loosening and debonding a latex/filler binder system from the secondary backing by application of pressurized fluids and chemical solutions. This method has however the drawback that high amounts of energy have to be spent in a process using vast amounts of chemicals, while in addition the problem of residual presence of the adhesive in/on the yarn/fabric is not solved satisfactory.

U.S. Pat. No. 5,840,773 describes a method of extracting nylon from carpet waste by dissolving it in an alcohol-water agent. This method uses large quantities of organic solvents. Another example is U.S. Pat. No. 5,889,142 which discloses dissolving nylon from carpet in a caprolactam-water mixture.

Another approach is to modify the adhesive, allowing it to be more easily separated. Although various modified (latex-based) adhesives for carpet tiles have been described, in general these are not easily separated or removed from carpet fibres.

For example, U.S. Pat. No. 4,191,799 discloses an adhesive prepared from a copolymer of styrene, butadiene, and a carboxylic acid-containing monomer, combined with an olefin-grafted mineral oil extender; U.S. Pat. No. 3,546,059 discloses an adhesive prepared from styrene, butadiene, vinylidene chloride, and a functional monomer that improves the bonding of the fibres of the composite material.

U.S. Pat. No. 6,610,769 discloses adhesives for use in carpet and that employs a copolymer dispersion of styrene, butadiene, and a mixture of ethylenically unsaturated carboxylic acid monomers and latex.

JP 6343542 describes the use of a water-soluble adhesive that can be decomposed or dissolved when the adhesive is immersed into water or hot water. Water-soluble adhesives and copolymer emulsion adhesives are used alone or in combination.

However, none provide a satisfactory solution to the problem discussed above with respect to efficient recycling of objects such as carpet or carpet tiles, and none provide a satisfactory adhesive that can be suitably used in a carpet or carpet tiles that can be recycled.

It would thus be advantageous to develop a more environmental-friendly adhesive suitable for use in, for example, carpets or carpet tiles, that has long durability, resistance to blistering, has good adhesive properties, retains strength when wet, but that can easily be removed without use of vast amounts of organic compounds or shear forces or other mechanical and environmentally unfriendly chemical treatments, and allows for the removal and/or separation of a backing layer from the carpet face fibres and efficient recycling of both the carpet face layer and the backing layer.

SUMMARY OF THE INVENTION

A carpet material with at least one of its components made easier for recycle by use of an adhesive which can be selectively altered to change the adhesion strength to allow component carpet layers to be separated.

DETAILED DESCRIPTION OF THE INVENTION

It has now surprisingly been found that at least one of the above mentioned problems can be solved by the adhesives, use of said adhesives, and/or methods for preparing such adhesives as disclosed in the claims as well as by the surprising benefits obtained by using said adhesives in combination with objects such as carpet or carpet tiles.

In a first aspect of the invention there is provided an object formed from a plurality of components, said object having a first form and a second form in which at least one of the components of the object are made more readily available for recycling or disposal wherein the object includes an adhesive composition, the condition of which can be selectively altered to allow the change in condition of the object from the first to the second form to be achieved.

In one embodiment the first form of the object is for use as a floor covering or as a part thereof. In particular the object can be carpet or a carpet tile.

In one embodiment the adhesive is a hot aqueous solvent switchable adhesive comprising or essentially consisting of a plasticized esterified expanded starch.

In one embodiment the change in condition is achieved by causing the adhesive to lose or at least reduce it's adhesion with respect to at least one component of the object. Typically the reduction in adhesion is sufficient to allow the separation of at least one component from the object to be more easily achieved.

In addition, the current invention relates to a method of using such hot aqueous solvent switchable adhesive as the agent for allowing the adaptability of the object to be achieved.

In one embodiment said plasticized esterified expanded starch is obtained by at least expanding starch to provide an expanded starch, esterification of the expanded starch to provide an esterified expanded starch, and plasticization of the esterified expanded starch to provide a plasticized esterified expanded starch.

The term "hot aqueous solvent switchable adhesive" refers to an adhesive that can be treated to lose or at least reduce its adhesive function, by treatment of an object, for example a carpet or carpet tile, including said adhesive, with a solvent at a temperature allowing the adhesive to dissolve or disintegrate, thereby losing or reducing its adhesive function within the object.

In practicing the current invention, for example, a hot aqueous solvent switchable adhesive that is applied in a carpet or carpet tiles can be removed by submerging the same in an aqueous solvent, for example water, at a temperature at for example about 100° C., or by treating the carpet or carpet tile with hot steam, or by other means disclosed herein. The hot aqueous solvent switchable adhesive according to the invention comprises or essentially consists of the plasticized esterified expanded starch described above.

The starch used as the starting material may be obtained/derived from any normal source of starch, including corn, potatoes and wheat. Starch normally comprises two major components, amylose and amylopectin. The unbranched amylose consists of glucose molecules which are mutually linked by means of an alpha-1,4 glycosidic bond, whereas amylopectin is branched.

The terms "plasticized", "plasticization", "plasticity" and "plasticizers" all refer to the characteristic of plasticizers to modify/increase the plasticity or fluidity of the material to which they are added, e.g. to soften polymers.

The terms "esterified", or "esterification" and the like all relate to chemical reactions in which two chemicals form an ester as the reaction product.

The term "expanded starch" as used herein refers to its normal meaning in the technical field and denotes a starch that has been treated and, as a consequence of such treatment, shows an increased surface area, porosity and decreased density in comparison to the untreated starch. Surface area can be determined by methods available in the art, preferably as exemplified in the examples.

It has been found that an adhesive according to the invention is in particular suitable as an adhesive for use in floor coverings, in particular carpets or carpet tiles or rugs (although the use of the adhesive is not limited to only such use.).

The adhesive can show at least one, or any combination, of the following characteristics including good adherence of parts forming an object, for example a carpet or carpet tile (see examples below); long durability; resistance to blistering; retains strength when wet; can completely and easily be "switched", meaning it can be treated, when used as an adhesive in an object, without use of vast amounts of organic compounds, to lose or at least reduce its adhesive function in said object, allowing, without the need of high shear forces or other mechanical and environmental unfriendly chemical treatment, to (more) easily disassemble those components of the object that were (directly or indirectly) adhered to each other by said adhesive; and/or allows for improved removal and/or separation of a backing layer from the carpet face layer and/or also further disassemble and separation of parts of said layers, and efficient or improved recycling of both the carpet face layer and the backing layer, in comparison to a non-switchable adhesive.

When the adhesive is for example applied in carpet or carpet tiles, it can function in locking fibres of the carpet face layer into place, and adhering it to the backing layer (either directly or indirectly via an intermediate layer.).

While the adhesive of the invention can be applied to the back of any woven or non woven carpet or carpet tiles material to secure the base yarns to for example other yarns of the carpet face layer, as well as the carpet face layer to the backing layer, it is particularly useful in the manufacture of piled or tufted carpet or carpet tiles. In tufted loop or cut pile carpet or carpet tiles, the yarn is inserted or stitched through a primary backing fabric by means of an array of needles. The primary backing fabric is typically a nonwoven polyester or a woven polypropylene fabric although other materials can be used. The yarn is then secured to the primary backing with an adhesive precoat. Another process exists in which the pile surface and backing are formed at the same time by a weaving process. In both these types of carpet or carpet tiles the yarns are mechanically as well as adhesively attached to the backing layer. In another type of carpet or carpet tiles construction, the pile yarns are cut or looped and positioned to form a pile layer which is then secured to the backing layer with adhesive. Carpet or carpet tiles of this type are known as Fusion Bonded.

Carpet tiles typically include a backing layer made up of a plurality of layers. The construction of these tiles are fairly complex and may consist of the carpet face layer of a fibrous, e.g. tufted, primary cloth which has been impregnated with latex to stabilize the tufting, and laminated to, for example, a polypropylene layer by using the bitumen.

For a thorough discussion of the manufacture or carpet tiles or carpets and especially tufted carpets reference is made to "Carpets And Other Textile Floor Coverings," Robinson, 2nd Ed., 1972, Textile Book Service, Division of Bonn Industries Inc., The Trinity Press, London. Please, also, see "Wellington Sears Handbook of Industrial Textiles," Kaswell, 1963, Wellington Sears Co., Inc., New York.

In particular, it has been found that the adhesive of the current invention is advantageous when the backing layer comprises (oxidized) bitumen, or polymer-modified bitumen or alternatively when the backing layer includes PVC. Such materials are frequently used as a backing material in the manufacture of carpet or carpet tiles. The carpet or carpet tile produced has a fibrous face surface herein after referred to as a carpet face layer in a non limiting manner and a back surface integrally bonded to the bitumen composition or PVC, hereinafter referred to in a non limiting manner as a backing layer. Typically a secondary backing sheet is secured to the back surface of the bitumen or PVC backing layer.

Figure 1:
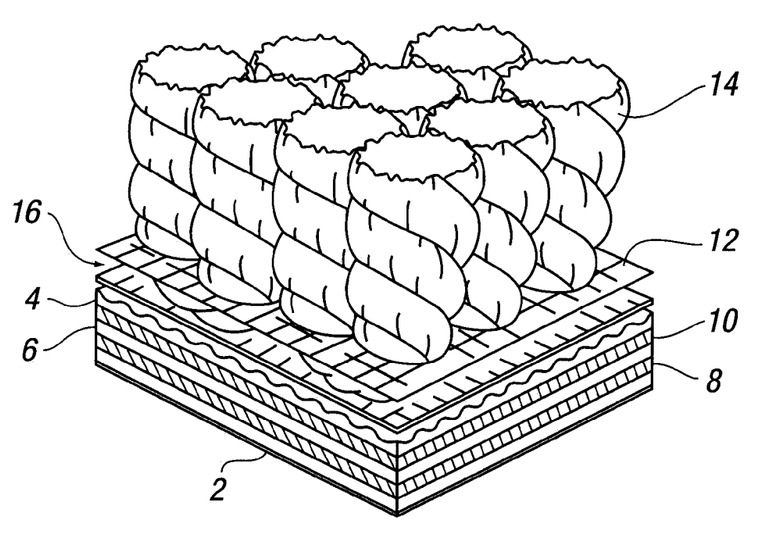
FIG. 1 is a schematic showing the composition and layers of the carpet of this invention.

The carpet face layer can be in the form of or include yarn, carpet face fibre and/or tufts and denote a wide variety of materials that can be suitably used in carpet and carpet tiles and that generally form the carpet face layer i.e., the cloth that is typically seen and walked on (See FIG. 1).

Non-limitative examples are natural or synthetic organic fibres or mixture thereof, materials like silk, cotton, wool, hair, nylon, acrylics, polyester, polyvinyl chloride, polypropylene fibres and the like. These materials might contain fire retardants, antistatic agents, bacteriostats, antidegradants, dyes, pigments, optical brighteners, and the like.

The terms "backing layer" refers to material supporting the carpet face fibres and which material is typically a solid, possibly multilayered, polymeric material serving to provide cushioning and dimensional stability to the floor covering material, and are typically directly or indirectly connected to for example glass backing (see FIG. 1) and/or carpet face fibres.

When applied in carpet or carpet tiles and the like, an adhesive composition must have high adhesive strength when dried to keep the backing layer and carpet face layer attached, and must retain sufficient strength when wet to prevent premature failure of the carpet or carpet tiles by separation of the fibres of the carpet face layer from the backing layer, for example during cleaning.

However, while conventional adhesives for carpet or carpet tiles typically have such dry and wet strengths, they are not easily removed from carpet fibres, and typically require extensive chemical or mechanical treatment to be removed. In contrast, the adhesive according to the invention can easily be "switched", meaning it can be treated to lose or at least reduce its adhesive function, without the need of organic solvents, high shear strength and the like, as will be discussed in detail below.

In a preferred embodiment there is provided an adhesive as described above wherein the expanded starch has a surface area of at least 80 m2/gram, more preferably at least 100 $m^2$/gram, even more preferably at least 150 $m^2$/gram, most preferably at least 175 $m^2$/gram.

It has been found that when the surface area of the starch molecules is at least 80 $m^2$/gram, more preferably at least 100 $m^2$/gram, even more preferably at least 150 $m^2$/gram, most preferably at least 175 $m^2$/gram, an adhesive with advantageous properties within the context of the current invention can be provided.

It has been found that expanded starch with a surface area as mentioned above can advantageously be used in providing the adhesive according to the invention. It has been found that lower surface areas provide less efficient plasticisation and modification as higher surface areas. It is believed that esterification is slower and does not achieve the same degree of substitution (DS). Therefore, the product would not show the same advantageous properties as a product obtained from a starch with a surface area as described.

As will be understood by the skilled person, this in general implies that natural starches require modification by expanding the starch, in that the surface area is increased, in order to be suitably used in providing an adhesive according to the invention. The person skilled in the art knows how to determine the surface area of starch, and is preferably as described in the examples.

In another preferred embodiment there is provided an adhesive according to the invention, wherein the esterified expanded starch has a degree of substitution (DS) of at least 1.2, more preferably at least 1.5, even more preferably at least 2.0, most preferably at least 2.4.

The term "degree of substitution (DS)" as used herein refers to its normal meaning in the technical field and indicates the average number of reactive hydroxyl groups replaced by substituent groups per glucose residue in a starch derivative. Degree of substitution can be determined as shown in the examples.

It has been found that when the esterified expanded starch has a degree of substitution as described above (i.e. has a degree of substitution of at least 1.2, more preferably at least 1.5, even more preferably at least 2.0, most preferably at least 2.4) the adhesive according to the invention is in particular suitable as an "Hot aqueous solvent switchable adhesive", in particular when applied in carpet or carpet tiles.

It is believed that the "degree of substitution" is important for reducing the susceptibility of the material to water. Indeed it has been found that the degree of substitution has preferably a value as described above. It has been found that the esterified expanded starch with a degree of substitution as mentioned above can advantageously be used in providing the adhesive according to the invention.

In another preferred embodiment there is provided an adhesive according to the invention, wherein the plasticized esterified expanded starch has a delamination strength of in the range of about 50 N to about 80 N, preferably in the range of about 55 N to about 75 N, more preferably in the range of about 65 N to 70 N, as determined by the modified BS7399:1991 test described in the examples.

In other words, in another preferred embodiment there is provided an adhesive according to the invention, wherein the plasticized esterified expanded starch has a delamination strength of in the range of about 50 N to about 80 N, preferably in the range of about 55 N to about 75 N, more preferably in the range of about 65 N to 70 N, as determined in accordance with BS7399:1991, but with the modification that the specimens tested were approximately 5 mm wide and 200 mm long, and the force to continue the delamination is measured by means of a tensile tester (Testometric Micro 350) at a speed of 100+/−10 mm/min and the mean delamination force over the range 50%-75% of the total extension is measured. (Instead of the median of peak values over a range 25%-75% of the extension).

In another preferred embodiment of the current invention, the esterified expanded starch, as used in obtaining the starch according to the invention, has a density in the range of from 0.10 gr/cm$^3$ to 0.40 gr/cm$^3$, preferably from 0.12 gr/cm$^3$ to 0.25 gr/cm$^3$.

In one embodiment the density is in the range from 0.20 gr/cm$^3$ to 0.30 gr/cm$^3$.

The person skilled in the art knows how to determine the density of starch. It has been found that the esterified expanded starch with a density as mentioned above can advantageously be used in providing the adhesive according to the invention.

In addition to the above, the adhesive according to the invention can advantageously be described/defined by a product-by-process, and is not limited within the context of the current invention to the manipulation of the recited steps, but only to the structure implied by the steps.

The adhesive according to the present invention in one embodiment is obtainable by:
a. providing starch;
b. subjecting the starch to hot aqueous solvent treatment in order to gelatinize the starch;
c. treating the gelatinized starch to induce retrogradation in said gelatinized starch to obtain expanded starch;
d. adding non-aqueous water-soluble solvent to precipitate the expanded starch, substantially separating the precipitated expanded starch from the solvent and further washing of the expanded starch with a non-aqueous water-soluble solvent until at least 90 vol. % of the aqueous solvent added under step b is removed;
e. suspending the expanded starch in inert water-free organic solvent, adding a catalyst, adding a fatty acid anhydride and either
  i. keeping the mixture at a temperature and for a period of time sufficient to allow the formation of an esterified expanded starch, or
  ii. treating the mixture in a micro-wave oven at 100-1000 W and for a period of 1 to 10 minutes sufficient to allow the formation of an esterified expanded starch;
f. adding non-aqueous water-soluble solvent to precipitate the esterified expanded starch, and drying of the esterified expanded starch; and
g. admixing a plasticizer to the esterified expanded starch, allowing the formation of a plasticized esterified expanded starch.

In one embodiment drying of the obtained expanded starch is performed in step d.

As will be understood by the skilled person the adhesive according to the invention preferably is comprised of, or consists essentially of the obtained plasticized esterified expanded starch as described by the process above.

In a further aspect there is provided a method for preparing a hot aqueous solvent switchable adhesive according to the invention, and as for example described by the product-by-process above.

The particulars of both the described product-by-process and the method according to the invention are described below.

In general, starch is characterized by low surface areas (<1 m$^2$/gram) and pore volumes (<0.1 cm$^3$/gram) but the structure of starch can be opened up by gelatinization.

The person skilled in the art knows how to induce gelatinization of starch. For example, when heat is applied to starch granules suspended in an aqueous liquid, the starch granules absorb water and swell. Starch molecules have many hydroxyl-groups which can interact with the water molecules, attracting and holding them. The smaller amylose molecules diffuse out of the swollen starch granule and form a 3-D network which traps additional water. In other words, starch gelatinization is a process that breaks down the intermolecular bonds of starch molecules in the presence of water and temperature and allows the hydrogen bonding sites (the hydroxyl hydrogen and oxygen) to engage more water.

It has been found that in the process for providing the adhesive according to the invention, preferably the starch is treated by heating in an aqueous solvent, like water, at a temperature of about 50° C. to 200° C., more preferably of from 70° C. to 160° C., even more preferably of from 90° C. to 130° C. As a consequence of such treatment, the starch granules first swell and then collapse to form a gel (this is generally characterized by an increase in viscosity and at the moment of collapse, a decrease in viscosity).

As discussed above, it has been found that in order to provide for the adhesive according to the invention, a surface area of at least 80 m$^2$/gram, more preferably at least 100 m$^2$/gram, even more preferably at least 150 m$^2$/gram, most preferably at least 175 m$^2$/gram starch (dry) at this stage in obtaining the adhesive is preferred.

It has appeared preferable that after heat treatment of the starch to induce gelatinization of the starch, the starch is further treated to induce retrogradation, for example by storing at low temperature (see below). The time necessary to achieve the necessary retrogradation depends on the type of material used and is typically between two and three weeks for normal corn starch or one day for high amylose-content corn starch.

For example, corn starch heated to 110° C. for 3 hours achieved a surface area after retrograding for 3 weeks at 5° C. of 150-160 m$^2$g$^{-1}$. High amylose corn starch heated to 120-130° C. in a pressure cooker for 1 hour 30 minutes achieved a surface area after retrograding for 2 days at 5° C. of 180-250 m$^2$g$^{-1}$.

Retrogradation denotes that dissolved starch transposes from an amorphous state to an insoluble, aggregated, semi-crystalline state. It is believed the retrogradation takes place as molecular reassociation of the hydrated and dispersed starch molecules, presumably through hydrogen bonding. The retrogradation appears in particular to occur in the amylase molecules.

It has been found that, preferably, this retrogradation can be achieved by, for example, keeping the gel at low temperatures (e.g. 5° C.). More preferably retrogradation is induced by storing the hot aqueous solvent treated starch at a temperature below 25° C., preferably below 10° C., more preferably below 5° C., but above −5° C., for at least 10 hours, preferably at least 24 hours, more preferably at least 100 hours, more preferably at least 500 hours.

Next, it has been found that in order to provide for the adhesive according to the invention, it is most preferred that the aqueous solvent used for the heat-treatment to induce gelatinization of the starch as described above, is removed from the starch. Keeping substantial amounts of, for example, water present in the starch mixture has been found to reduce, or even destroy, for example, the surface area of the starch, and thereby does not allow or not satisfactorily provide for the adhesive of the current invention.

In other words, it has been found that in order to obtain an adhesive according to the invention it is preferable that care is taken that substantially all water (>90%) of the aqueous solvent used to induce gelatinization is removed. It has been found that presence of too much water in the starch during subsequent steps in obtaining the starch according to the invention, causes the structure of the expanded starch to disintegrate, not providing the optimal adhesive.

In order to remove said aqueous solvent, starch can first be precipitated by the addition of a compound capable of precipitating the starch (for example a simple alcohol), after which the aqueous solvent can be separated from the starch.

It will be clear for the skilled person that additional repeating of steps to remove aqueous solvent might be required, for example, at least 2, 3, 4 or 5 times.

Moreover, it is important to note that the compound used to precipitate the starch (and/or to remove the aqueous solvent) is inert towards the (expanded) starch and does not, or substantially not, modify its important characteristics for the current invention, for example it should not or, not substantially, reduce the surface area of the starch.

The removal of (excess) aqueous solvent, like water, from the starch is preferably achieved by washing steps with a non-aqueous water-soluble solvent, for example a suitable alcohol, also used (or usable) to precipitate the starch.

Preferably, the non-aqueous water-soluble solvent allowing the starch to precipitate is selected from the group consisting of methanol, ethanol, propanol, and butanol.

The role of the non-aqueous water-soluble solvent, for example a suitable alcohol like ethanol, is to remove water from the gel without collapsing the pore structure and/or substantially modifying the surface area of the expanded starch. It has been found that this preferably requires a liquid which is miscible with water but has a lower surface tension. Such non-aqueous water-soluble solvents, for example an alcohol like ethanol, have the advantage that it is miscible with water, thereby allowing efficient removal of water from the mixture by simple removal of the solvent. In addition, the alcohol does not, or at most only minimally interferes with the starch, thereby causing unwanted modification of the properties of the starch. Moreover, when a non-aqueous water-soluble solvent with low boiling temperature is employed, it allows for easily drying of the starch afterwards.

It has been found that in particular ethanol is effective for this purpose although other alcohols give similar if smaller effects. As already mentioned above, in a next step, and after removal of excess aqueous solvent, the expanded starch is preferably dried, for example by vacuum drying. This might be done for example under a nitrogen stream.

In another preferred embodiment the non-aqueous water-soluble solvent added under step d) is in a ratio of from 1 volume non-aqueous water-soluble solvent to 5 volumes aqueous solvent added in step b) to 5 volume non-aqueous water-soluble solvent to 1 volume hot aqueous solvent added in step b).

In other words, preferably, the non-aqueous water-soluble solvent is added in a ratio of from 1 volume non-aqueous water-soluble solvent to 5 volumes of the aqueous solvent used in gelatinization of the starch to 5 volume non-aqueous water-soluble solvent to 1 volume aqueous solvent used in gelatinization of the starch by the hot aqueous solvent treatment.

By applying the above-mentioned volume ratios efficient precipitation of the starch is achieved, while in addition, efficient removal of the aqueous solvent is achieved. The person skilled in the art will understand that the current invention is not limited to using one and the same non-aqueous water-soluble solvent, in case further washing steps are performed, but that, although not particularly preferred different non-aqueous water-soluble solvents of mixtures thereof might be employed.

It has, in addition, been found that in a further preferred embodiment, a suitable adhesive according to the invention is obtainable when after the further washing of the precipitated starch the precipitated starch is at least once washed with the inert water-free organic solvent of step e), and omitting the drying of the obtained expanded starch.

It has surprisingly been found that by at least once washing with the water-free organic solvent also to be used for subsequent esterification of the expanded starch, there is limited need for drying of the obtained expanded starch, thereby limiting the time required to obtain the adhesive according to the invention.

Preferably, either in the embodiment described above, omitting the drying step, or in the other embodiments disclosed herein, including the drying step, the inert water-free organic solvent is selected from the group consisting of toluene, benzene, and xylene etc.

It has been found that in particular the use of these inert water-free organic solvents is particularly effective. The person skilled in the art understands that water-free is to be construed as describing an organic solvent not comprising more than 1 w/w % of water, preferably no more than 0.5 w/w % water, preferably free of water.

It has been found that at this stage in obtaining the adhesive according to the invention, or in practising a method according to the invention there is preferably provided an expanded starch formed, using a very repeatable process, having a surface of at least 80 $m^2$/gram, more preferably at least 100 $m^2$/gram, even more preferably at least 150 $m^2$/gram, most preferably at least 175 $m^2$/gram.

For example, the surface area of the expanded starch is in the range of from 130 $m^2$/gram to 270 $m^2$/gram, preferably from 140 $m^2$/gram to 260 $m^2$/gram, more preferably from 175 $m^2$/gram to 205 $m^2$/gram.

In order to provide for the adhesive according to the invention, the obtained expanded starch most preferably is further modified, for example and preferably by esterification, and maybe other modifiers. It has been found that if such modification is not performed, an adhesive according to the invention, and suitable for the use according to the invention, is more difficult to obtain.

The person skilled in the art knows how esterification of starch can be achieved, and is for example described in various patents and scientific publications (see for example Kirk-Othmer, Encyclopedia of Chemical Technology, 1997, 4th edition, Vol. 22, p. 699-719 and Ullmann's Encyclopedia of Industrial Chemistry, Vol. A25, 1994, p. 1-18.)

For example, low DS (~0.5) acetylated starch can be prepared in a system employing acetic anhydride-aqueous alkali at pH 7-11 and room temperature. This method can only be employed when preparing lightly substituted acetylated starches, however. Starch granules treated with acetic anhydride alone at 20° C. for 5 months will not, it is believed, result in any reaction. At room temperature, pyridine treatment renders the starch granule reactive, though.

Treatment of starch with acid anhydride in DMSO (dimethyl sulfoxide) requires triethylamine as a catalyst and acid scavenger. With this method, starch derivatives of acetic, propanoic, and butanoic anhydrides have been prepared up to DS of 0.08.

When employing glacial acetic acid alone at 100° C. for 5-13 h, the esterification gives a product with 3-6% acetyl groups. Treatment of starch with concentrated formic acid leads to gelatinization and simultaneous esterification. Acetylation with ketene produces starch with an acetyl content of 2.2-9.4%. The reaction is usually conducted in acetic acid, diethyl ether or acetone with an acid catalyst.

Also vinyl acetate has been employed in the acetylation. A method comprising reacting starch in the presence of an alkaline catalyst, such as an alkali metal carbonate or hydroxide, ammonium hydroxide or an aliphatic amine, and more than 10% water by weight of dry starch with an ester of a carboxylic acid and an ethylenically unsaturated alcohol, such as vinyl acetate can be used.

U.S. Pat. No. 2,461,139 discloses another method for preparing starch esters. The method includes reacting starch and water with an organic acid anhydride and maintaining the pH of the reaction in the alkaline range between 7 and 11. The organic acid anhydrides include acetic anhydride, propionic anhydride, phthalic anhydride and butyric anhydride. Typically, starch is suspended in water at 25° C. and sodium hydroxide is added to raise the pH to about 10. Then enough acetic anhydride is added to the suspension to lower the pH to about 7 followed by separating the starch ester by filtration.

From the above, it is clear that many methods for performing esterification of starch have been described. Besides realizing that in order to obtain the adhesive according to the invention it is much preferred, if not necessary to modify an expanded starch by for example esterification, in addition it has also surprisingly been found that the method applied for esterification appears critical.

It has been found that for obtaining the adhesive of the current invention esterification of the (expanded) starch can not be carried out by just any of the available methods for esterification.

For example, it has appeared that methods providing (expanded) starches with a DS of less than 1.0 does not sufficiently allow to obtain a suitable adhesive of the current invention.

Furthermore, performing the esterification in relative aqueous conditions also does not allow for obtaining the adhesive according to the invention.

The use of particular catalysts like pyridine or NaOH (50% w/w in aqueous solvent) at this stage does also appear not to provide for an adhesive according to the invention. As the skilled person will understand, some less aggressive catalyst may also catalyse the reaction maintaining the surface area to some degree.

It was thus established after intensive experimentation that in order to provide an adhesive of the invention it is highly advantageous that catalyst, solvent and reagent, i.e. the compounds used in esterification of the expanded starch to provide the esterified (expanded) starch must be substantially inert (besides providing for esterification of the starch) towards the obtained expanded starch, and as described above.

These compounds should therefore not, or substantially not, interact with the expanded starch and thereby substantially modify for example the surface area of the expanded starch. It has been found that particular compounds might dramatically influence the surface area of the expanded starch and thereby do not allow to provide the adhesive according to the invention.

Therefore, it has surprisingly been found that in order to obtain adhesive according to the current invention, esterification is preferably performed by using an inert water-free organic solvent that is selected from the group consisting of toluene, benzene, and xylene etc. In particular toluene is preferred, as it provides good results in performing the invention. The person skilled in the art knows how to perform esterification, for example as shown in the Examples herein.

In another preferred embodiment, the catalyst is selected from the group consisting of amines, dimethylaminopyridine (DMAP), triethylamine, and pyridine, most preferably the catalyst is DMAP. In particular these catalysts have been found to efficiently enhance esterification, whereas others, for example acid catalysts like H2SO4, are less preferable.

Preferably, in obtaining the adhesive according to the invention, a fatty acid anhydride is used as the reagent, i.e. as the compound used to react with the expanded starch to provide the esterified starch. Preferably the fatty acid anhydride is from C2 fatty acid anhydride to C12 fatty acid anhydride, or mixtures thereof, preferably from C2 fatty acid anhydride to C6 fatty acid anhydride, most preferably the fatty acid anhydride is acetic anhydride.

Other examples of such monocarboxylic fatty acid anhydrides containing 2-7 carbon atoms, and suitable in the current invention, are acetic acid, mono-, di- or tri-chloracetic acid, mercaptoacetic acid, propionic acid, 2-hydroxypropionic acid, 2-chloropropionic acid, acrylic acid, 2-bromo-2-methyl propionic acid, methacrylic acid, 2,2-dimethyl propionic acid, butyric acid, isobutyric acid and crotonic acid.

In another preferred embodiment, in order to provide the adhesive according to the invention, the esterified expanded starch, obtainable as described above is admixed with a suitable plasticizer allowing the formation of a plasticized esterified expanded starch according to the invention.

For the first time it has been found that such plasticized esterified expanded starch obtainable by the steps described herein, acts as an adhesive that can be used as a hot aqueous solvent switchable adhesive.

It has been found that the plasticizer applied is preferable selected from the group consisting of phthalate esters, dimethyl- and diethylsuccinate, glycerol triacetate (triacetin), glycerol mono- and diacetate, glycerol mono-, di- and tripropionate, glycerol tributanoate (tributyrin), glycerol mono- and dibutanoate, glycerol mono-, di- and tristearate, and other related glycerol esters, lactic acid esters, citric acid esters, adipic acid esters, stearic acid esters, oleic acid esters, ricinoleic acid esters, other fatty acid esters, glycerol, polycaprolactone, glyceryltrioleate, preferably the plasticizer is glycerol or glycerol triacetate, most preferably the plasticizer is glycerol triacetate.

Preferably, the plasticizer is admixed in an amount from 10 to 40%, preferably from 15 to 35%, more preferably from 20 to 30% by weight based on the esterified expanded starch. This has been shown to in particular allow for providing an adhesive according to the invention.

In another embodiment of the current invention, esterification is performed by keeping the mixture comprising expanded starch, inert water-free organic solvent, catalyst, and a fatty-acid anhydride at a temperature below the boiling point of the inert water-free organic solvent in the range of from 30° C. to 130° C., more preferably from 50° C. to 105° C., most preferably from 70° C. to 100° C.

The adhesive or esterified expanded starch according to the invention can advantageously be admixed with flame-retardants, fillers, preservatives, binders, antimicrobial agents, commonly applied in the art, in particular when the adhesive or esterified expanded starch according to the invention is applied as an adhesive in carpet or carpet tiles and the like. Examples of such materials include alumina trihydrate, zinc borate, calcium carbonate, china clay and conductive carbon black.

As will be understood by the skilled person it might be advantageous to admix particular compounds to the adhesive, for example flame-retardants, fillers, preservatives, binders, antimicrobial agents can be admixed to the esterified expanded starch, or to the plasticized esterified expanded starch, or at any procedural step in the formation of the adhesive according to the invention, as long as the addition in the end does not substantially negatively change the adhesive with respect to for example its use as an adhesive, for example in carpet or carpet tiles and as described herein.

It has thus been found that the adhesive described herein and obtainable by the various methods described herein is an environmental-friendly adhesive suitable for use in carpets or carpet tiles, that can have long durability, resistance to blistering, good adhesive properties, retains strength when wet, but that can almost completely and easily be removed without the use of vast amounts of organic compounds or shear forces or other mechanical and environmental unfriendly chemical treatments, and allows for the removal and/or separation of a backing layer from the carpet fabric (or yarn) and efficient recycling of both the carpet face layer and the backing layer.

According to another aspect of the invention, there is thus provided the use of an adhesive according to the invention, for example obtainable as described herein, as a hot aqueous solvent removable adhesive.

It has been found that it can be advantageously applied in particular to floor coverings such as carpet or carpet tiles or rugs.

The use of the adhesive according to the invention now for the first time allows for efficient and environmental methods for recycling objects wherein such adhesive is applied, and in preparing such recyclable objects.

Therefore, in another aspect according to the current invention, there is provided a method of preparing a recyclable carpet or carpet tile comprising the steps of providing a carpet face layer, providing a backing layer, contacting the adhesive according to the invention with the carpet face layer and the backing layer thereby adhering the carpet face layer to the backing layer with the adhesive.

Also provided is a method for recycling components of carpet or carpet tiles comprising the steps of providing a recyclable carpet or carpet tile obtained as described above and optionally reducing the size of the recyclable carpet or carpet tile; treating the recyclable carpet or carpet tile with an hot aqueous solution preferably, at least 20° C., preferably, at least 30° C., preferably, at least 70° C., more preferably, at least 90° C., i.e. at room temperature or above, or steam, for a period of time sufficient to allow the hot aqueous solvent removable adhesive to (substantially) detach (or de-adhere); and separating the carpet face layer from the carpet backing layer. Most preferably steam is used.

It will be understood by the skilled person that a floor covering, such as a carpet or carpet tile, that at least comprises a carpet face layer, a backing layer, and an adhesive according to the invention and which adhesive directly or indirectly adheres the carpet face layer to the backing layer has advantageous properties. Directly or indirectly is to be construed as indicating that the carpet face layer might be directly adhered to the backing layer by the adhesive, i.e. without any additional intermediate layer, or indirectly, i.e. with/via an additional intermediate layer.

It has further surprisingly been found that the adhesive according to the invention has in particular good flame retardant properties. Therefore, in a preferred embodiment, the adhesive according to the invention is used as a flame retardant. The use of the adhesive as a flame retardant can be in addition to the provision of the adhesive as a means to allow the form of the object to change to be more easily recyclable but it should also be appreciated that it is another aspect of the invention that the use of the adhesive as herein described with an object in which the form of the object is not required to be changed is another aspect of the invention inasmuch that there is provided an object which is provided with flame retardant properties as a result of the use of the adhesive in accordance with the invention.

FIG. 1 shows a schematic representation of a typical build-up of a carpet or carpet tile in which there is provided a backing layer comprising a polypropylene layer 2 with backing layers 4, 6, possibly of bitumen, and with glass backing layers 8, 10 intermediate thereof. A primary backing fabric 12 is provided which interfaces with the yarn 14 to form the carpet face layer. An adhesive 16 in accordance with the invention is provided which engages the yarn and primary backing fibre together and with the backing layer. The adhesive is provided to be capable of being changed in condition so as to allow the carpet or carpet tile to be changed from the form shown in which the same is used as a floor covering, to a second form in which at least one of the components, and/or parts of the components can be rendered more easily separable for recycling purposes.

Examples of the generation of the adhesive and use of the same in accordance with the invention are now described with reference to the following examples.

Example 1

1.1 Gelatinization

Cornstarch 75 g (27% w/w amylose, 73% w/w amylopectin) 0.463 mol was added to 1.5 L of distilled water in a 2 L round-bottom flask. The mixture was then gelatinized in an oil bath at 110° C. with continuous stirring for 3 hours. As the person skilled in the art will understand gelatinization conditions will depend on the starch type. High amylose (70% amylose) cornstarch for example will preferably be performed at a higher temperature (~140° C.).

1.2 Retrogradation

Gelatinized cornstarch prepared in 1.1 was poured into 4×500 ml powder glass jars. While still hot, lids were attached forming a barrier against microbial activity. Samples were then labelled and placed in a fridge at 5° C. for 3 weeks. As the person skilled in the art will understand, also retrogradation stage depends on the starch type. High amylose (e.g. 70% amylose) cornstarch for example will retrograde sufficiently after only one or two days, as already described above.

1.3 Solvent Exchange

A.

Retrograded starch gel as obtained under 1.2, 1.5 L, 75 g was mixed for 15 minutes with 1 L of ethanol using an overhead stirrer (Heidolph 2050 RZR electronic). The mixture was then left to settle, and the separated solvent decanted off and replaced with a fresh 1 L batch of ethanol. This process was repeated five times. Water free expanded starch was then placed in a vacuum oven set at 50° C. for 12 hours.

B.

As above, but wherein the last solvent exchange was with toluene instead of ethanol and in this case it was found that the drying step could be reduced or avoided altogether.

1.4 Esterification

A.

5 g (30.9 mmol) expanded starch, as obtained under 1.1-1.3, with a surface area of more than 160 m$^2$/g was added to a 100 ml two-necked round bottom flask. To this, 70 ml toluene was added, followed by 4.37 mls, 4.73 g (46.3 mmol) acetic anhydride (Aldrich). The mixture was heated to 90° C. and stirred for 5 minutes; after which 0.2 g (1.64 mmol) 4-(dimethylamino)pyridine (DMAP) was added. The reaction was maintained at 90° C. while stirring for 12 hours. Once completed the mixture was cooled to 20° C. and 50 mls of ethanol added. The precipitate formed was stirred for two minutes, filtered, and washed and filtered a further 4 times. The product was dried at 40° C. for 24 hours under reduced pressure.

B.

As under A, with the only difference that the reaction was not maintained at 90° C. while stirring for 12 hours, but maintained in a microwave at 300 Watt for a period of 1-10 minutes (in this case 5 minutes).

1.5 Precipitation

The esterified expanded starch obtained above was precipitated by adding 1 volume of ethanol to the mixture.

1.6 Plasticizing

A 25% plasticized esterified expanded starch mix was prepared by weighing out 75 grams of the esterified expanded starch as obtained above into a large beaker (in case ATH as a flame retardant is tested, an additional 75 grams of ATH (alumina trihydrate) was added to the esterified expanded starch. Next, 25 grams glyceryl triacetate was weighed out into a small beaker and carefully added to the esterified expanded starch, while mixing with a spatula until uniformly dispersed. The mixture was then mixed in a 1 liter metal tin with acetone (up to a total volume of approximately 800 ml) and stirred in a Silverson HS mixer, while moving the tin to ensure uniform mixing. The mixture was stirred until a uniform paste consistency was produced.

Example 2

2.1 Determination of Surface Area of Starch

Nitrogen adsorption/desorption measurements of the starches was undertaken on a Micromeritics ASAP 2010 instrument at 77K with approximately 0.1 g of material. Prior to analysis, all samples were out-gassed for a minimum of 3 hours at 65° C. and corrected for mass differences after the experiment. Surface areas were calculated using the BET equation.

2.2 Determination of Starch Esterification—Titration Method

Titration is the methodology that is most accepted in the field. The repeating unit of starch (α-D-glucopyranose) has three hydroxyl groups; therefore the maximum degree of substitution (D.S.) for starch is usually quoted as being three. However, the D.S. could exceed three as end units can have four ester-groups, for example acetyl groups, attached. The titration method employed to determine the DS of the esterified (expanded) starch was based on the procedure employed by Wurzburg (Wurzburg, O., (Ed. Whistler, R.), Methods in carbohydrates chemistry, IV, Academic press, London, (1964), p 288.) For example, acetylated starch (1.0 g) was placed in a 250 ml flask and 50 ml of 75% ethanol in distilled water was added. The loosely stoppered flask was agitated, warmed to 50° C. for 30 min, cooled, and 40 ml of 0.5M KOH added. The mixture was left for 72 hours with occasional stirring. Excess alkali was back-titrated with 0.5M HCl using phenolphthalein as an indicator, after which it was left for a further 2 hours, and any additional alkali which may have leached from the sample titrated. A blank using the original unmodified starch was also tested. Acetyl content (Acetyl %) was calculated according to equation below:

$$\text{Acetyl \%} = \frac{([\text{Blank (cm}^3) - \text{Sample (cm}^3)]'\text{Molarity of HCl}'0.043'\,100}{\text{Sample Weight (g)}}$$

Blank and sample titration volumes in ml, sample weight was in g. DS is defined as the average number of sites per glucose unit that possess a substituent group (See Singh, N., Chawla, D., Singh, J., Food Chem., 86, (2004), 601-608; Whistler, R., Methods in Carbohydrate chemistry: Starch, Vol. IV, Academic Press, London, (1964); Elomaa, M., Carbohydrate Polymers, 57, (2004), 261-267). Acetyl % was used to calculate the D.S. according to the following equation:

$$D.S. = \frac{(162'\text{Acetyl \%})}{(4300 - [42'\text{ Acetyl \%}])}$$

2.3 Determination of Starch Esterification—Thermogravimetric Method

TG analysis of hydrolysed starch was carried out on a Seiko™ instruments Inc. SII Exstar 6000™, TG/DTA 6300™ using approximately 15 mg of material weighed in to a platinum sample pan. An empty platinum pan was used as reference. The sample was then heated using the following program:

20 to 400° C. at 10° C. minute$^{-1}$; hold for 1 minute.

The decomposition temperature was taken as the peak temperature from the dTG profile.

This value was then correlated against the D.S. value obtain for the particular acetylated starch tested according to the methodology described in 2.2.

2.4 Determination of Lamination Strength: A Modified BS7399 Test

A. Methodology for Lamination of Starch Precoated Topcloth to Pre-Cast Bitumen

The starch precoated topcloth was prepared by using a doctor blade, set at a 2-3 mm gap to apply a smooth layer of plasticized esterified expanded starch as obtained above to Aiki Kamala topcloth. Immediately after application, release paper was applied and the sample was rolled with a heavy roller (5200 gram, with a length of 38 cm and a diameter of 45 mm), as described below, in order to ensure good penetration into the backstitch. With the doctor blade set at the same gap, a second layer plasticized esterified expanded starch was applied. Afterwards the sample was dried in an oven at 70° C.

By introducing silicon-coated release paper between the topcloth and bitumen on the Bitumen Backing Line, a sample of pre-cast bitumen can be obtained, without any adhered topcloth. This will be a consistent 3150 gm$^{-2}$ of bitumen, extruded around two layers of glass fleece, with a polypropylene fibre backing.

Next, the pre-cast bitumen is heated (exposed bitumen towards the heat source, and fibre backing away) under infra-red until the bitumen starts to melt (approximately 180° C.-200° C.).

Whilst the bitumen is still molten, the starch precoated topcloth sample is laid on top of it (precoated side to molten bitumen), and a steel roller is used to apply pressure to the combined sample to aid consistent lamination. The roller used is 5200 gram, a length of 38 cm and a diameter of 45 mm, and is rolled four times over the sample. The sample is then rotated through 90° and the roller is used to apply pressure a further four times.

The sample is left to cool at ambient temperatures for 15 minutes before being trimmed down on the hydraulic press and die-cutter, to remove at least the outer centimeter of the precoated sample, where lamination pressures are inconsistent.

The laminated sample is then left to condition at 65+/−2% RH, 20+/−2° C., for 24 hours prior to testing.

Sample size for tensile testing is 40 mm×200 mm.

B. Delamination Force BS7399:1991

The delamination force is determined in accordance with British Standard 7399:1991, included herewith by reference, but with the following modifications:

The specimens tested were approximately 40 mm wide and 200 mm long, and the force to continue the delamination is measured by means of a tensile tester (Testometric Micro 350) at a speed of 100+/−10 mm/min. The test also differs from BS7399 in that the mean delamination force over the range 50%-75% of the total extension is measured in place of the median of peak values over a range 25%-75% of the extension.

2.5 Switchability (Modified BS7399; 1991)

Switchability is determined by repeating the measurement under 2.4B above (Delamination Force BS7399:1991) on duplicate specimens but after immersion of the sample in boiling water for 2 minutes followed by blotting to remove excess water immediately before measuring. The differences between the 2 sets of delamination values indicates the degree of switchability.

2.6. Other Tests

In addition to the above measurements, loop anchorage (in accordance with BS5229:1981); Martindale (in accordance with DD ISO/PAS 11856:2003), Castor chair (in accordance with EN985:1994), Hexapod (in accordance with ISO/TR10631:2000), Dimensional Stability (in accordance with ISO2551/EN986:2005), and Flammability (in accordance with ISO9329/1:1997) were measured.

3. Experimental Outcome 3.1

The starch as treated as described in detail under Example 1 was analyzed with the methods described under Example 2. Results as obtained are given in the tables below. It was found that applying either one of the two methods of solvent exchange as described under Example 1.3 and/or the two methods for esterification described under Example 1.4 did not substantially influence the properties of the plasticized esterified expanded starch obtained.

TABLE 1

| Test | Results/Grade | Pass/fail | Comments |
| --- | --- | --- | --- |
| Surface area of expanded starch | >160 m2 | | |
| Degree of substitution of esterified expanded starch | >2.5 | | |
| Density of esterified expanded starch | 0.2 to 0.3 g cm−3 | | |
| Loop anchorage | 28 N | | |
| Martindale | 2 | Pass | |
| Castor chair | R value = 2.6 | Pass | Good grade, >2.4 is suitable for intense use |
| Hexapod | S 3¾; L 2¾; Class 31 | | |
| Dimensional stability | L 0.04% W 0.05% | | Excellent |
| Flammability | without ATH: BL (mm) 130 CRF (KWm−2) 10.4 Smoke (%) 49.9 with ATH: BL (mm) 110 CRF (KWm−2) 10.5 Smoke (%) 67.8 (BL = burn length; CRF = Critical radiant flux) | Pass | Excellent |

TABLE 1-continued

| Test | Results/Grade | Pass/fail | Comments |
|---|---|---|---|
| Delamination strength | 60 N | Pass | |
| Delamination strength after immersion in water at 100° C. for 2 minutes (switchability) | 30 N | Pass | Lamination strength is reduced following treatment with hot water |

3.2

Plasticized esterified expanded starch is prepared as described above, with the modification that different types of starch are used. The results show that when different types of starch were treated to obtain plasticized esterified expanded starch as described herein, there can be provided hot aqueous solvent switchable adhesives according to the invention, suitable for use as adhesive in the preparation of floor covers, in particular carpet or carpet tiles.

Although corn starch and high amylose corn starch are described above, all starch sources are possible for use in obtaining an adhesive according to the invention. Preferable are those starches with a greater amylose content.

The invention claimed is:

1. Method for preparing a hot aqueous solvent switchable adhesive, the method comprising the steps of
   a. providing starch;
   b. subjecting the starch to hot aqueous solvent treatment in order to gelatinize the starch;
   c. treating the gelatinized starch to induce retrogradation in said gelatinized starch to obtain expanded starch;
   d. adding non-aqueous water-soluble solvent to precipitate the expanded starch, substantially separating the precipitated expanded starch from the solvent and further washing of the expanded starch with a non-aqueous water-soluble solvent until at least 90 vol. % of the aqueous solvent added under step b is removed,
   e. suspending the expanded starch in inert water-free organic solvent, adding of a catalyst, adding of a fatty acid anhydride and either
      i. keeping the mixture at a temperature and for a period of time sufficient to allow the formation of an esterified expanded starch, or
      ii. treating the mixture in a micro-wave oven at 100-1000 W and for a period of 1 to 10 minutes sufficient to allow the formation of an esterified expanded starch;
   f. adding non-aqueous water-soluble solvent to precipitate the esterified expanded starch, and drying of the esterified expanded starch; or addition of water which also facilitates precipitation of the esterified expanded starch;
   g. admixing a plasticizer to the esterified expanded starch, allowing the formation of a plasticized esterified expanded starch.

2. Method according to claim 1 wherein the drying of the obtained expanded starch is performed in step d.

3. Method according to claim 1 wherein the starch has an amylose content (w/w) of at least 20% or a debranced starch with a greater proportion of linear chains.

4. Method according to claim 1 wherein the gelatinized starch is obtained by hot aqueous solvent treatment at a temperature in the range of from 50° C. to 200° C.

5. Method according to claim 1 wherein retrogradation is induced by storing the hot aqueous solvent treated starch at a temperature below 25° C. but above −5° C., for at least 10 hours.

6. Method according to claim 1 wherein the non-aqueous water-soluble solvent is selected from the group consisting of ethanol, methanol, propanol, and butanol.

7. Method according to claim 1 wherein the non-aqueous water-soluble solvent is added under step d) in a ratio of from 1 volumes non-aqueous watersoluble solvent to 5 volume hot aqueous solvent added in step b) to 5 volume nonaqueous water-soluble solvent to 1 volume hot aqueous solvent added in step b).

8. Method according to claim 1 wherein after the further washing of the precipitated starch the precipitated starch is at least once washed with the inert water-free organic solvent of step e), and omitting the drying of the obtained expanded starch.

9. Method according to claim 1 wherein the inert water-free organic solvent is selected from the group consisting of toluene, benzene, and xylene.

10. Method according to claim 1 wherein the catalyst is selected from the group consisting of amines, dimethylaminopyridine (DMAP), triethylamine, and pyridine.

11. Method according to claim 1 wherein the fatty acid anhydride is from C2 fatty acid anhydride to C12 fatty acid anhydride, or mixtures thereof.

12. Method according to claim 11 wherein the fatty acid anhydride is acetic anhydride.

13. Method according to the claim 1 wherein the plasticizer is selected from the group consisting of phthalate esters, dimethyl- and diethylsuccinate, glycerol triacetate (triacetin), glycerol mono- and diacetate, glycerol mono-, di- and tripropionate, glycerol tributanoate (tributyrin), glycerol mono- and dibutanoate, glycerol mono-, di- and tristearate, and other related glycerol esters, lactic acid, esters, citric acid esters, adipic acid esters, stearic acid esters, oleic acid esters, ricinoleic acid esters, other fatty acid esters, glycerol, polycaprolactone, glyceryltrioleate.

14. Method according to claim 1 wherein the plasticizer is admixed in an amount from 10 to 40% by weight based on the esterified expanded starch.

15. Method according to claim 1 wherein further flame-retardants, fillers, preservatives, binders, antimicrobial agents are admixed to the esterified expanded starch or the plasticized esterified expanded starch.

16. Method according to claim 1 wherein the starch has an amylose content (w/w) of at least 40% or a debranched starch with a greater proportion of linear chains.

17. Method according to claim 1 wherein the starch has an amylose content (w/w) of at least 50% or a debranched starch with a greater proportion of linear chains.

18. Method according to claim 1 wherein the starch has an amylose content (w/w) of at least 60% or a debranched starch with a greater proportion of linear chains.

19. Method according to claim 1 wherein the gelatinized starch is obtained by hot aqueous solvent treatment at a temperature in the range of from 70° C. to 160° C.

20. Method according to claim 1 wherein the gelatinized starch is obtained by hot aqueous solvent treatment at a temperature in the range of from 90° C. to 130° C.

21. Method according to claim 1 wherein retrogradation is induced by storing the hot aqueous solvent treated starch at a temperature below 10° C., but above −5° C., for at least 24 hours.

22. Method according to claim 1 wherein retrogradation is induced by storing the hot aqueous solvent treated starch at a temperature below 5° C., but above −5° C., for at least 100 hours.

23. Method according to claim 1 wherein retrogradation is induced by storing the hot aqueous solvent treated starch at a temperature below 25° C., but above −5° C., for at least 500 hours.

24. Method according to claim 10 wherein the catalyst is DMAP.

25. Method according to the claim 1 wherein the plasticizer is glycerol or glycerol triacetate.

26. Method according to claim 1 wherein the plasticizer is admixed in an amount from 15 to 35% by weight based on the esterified expanded starch.

27. Method according to claim 1 wherein the plasticizer is admixed in an amount from 20 to 30% by weight based on the esterified expanded starch.

28. Method according to claim 1 wherein the fatty acid anhydride is from C2 fatty acid anhydride to C6 fatty acid anhydride.

* * * * *